United States Patent
Mizuno et al.

(10) Patent No.: US 9,144,995 B2
(45) Date of Patent: Sep. 29, 2015

(54) IMAGE FORMING APPARATUS AND IMAGE FORMING METHOD

(71) Applicant: FUJIFILM Corporation, Tokyo (JP)

(72) Inventors: Tomohiro Mizuno, Tokyo (JP); Tsuyoshi Matsumoto, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 20 days.

(21) Appl. No.: 13/968,711

(22) Filed: Aug. 16, 2013

(65) Prior Publication Data

US 2014/0055517 A1  Feb. 27, 2014

(30) Foreign Application Priority Data

Aug. 21, 2012  (JP) .................. 2012-182108

(51) Int. Cl.
*B41J 2/21* (2006.01)
*H04N 1/40* (2006.01)

(52) U.S. Cl.
CPC *B41J 2/21* (2013.01); *B41J 2/2132* (2013.01); *H04N 1/40087* (2013.01)

(58) Field of Classification Search
CPC ........................................................ B41J 2/2132
USPC .......................................................... 347/15
See application file for complete search history.

(56) References Cited

U.S. PATENT DOCUMENTS

| | | | | |
|---|---|---|---|---|
| 5,825,377 | A | * | 10/1998 | Gotoh et al. ................ 347/15 |
| 5,978,554 | A | * | 11/1999 | Hakamada et al. .......... 358/1.9 |
| 7,914,102 | B2 | | 3/2011 | Imai |
| 8,272,712 | B2 | | 9/2012 | Imai |
| 8,366,226 | B2 | | 2/2013 | Kato et al. |
| 2008/0158280 | A1 | | 7/2008 | Imai |
| 2010/0315458 | A1 | | 12/2010 | Kato et al. |
| 2011/0141185 | A1 | | 6/2011 | Imai |
| 2013/0113856 | A1 | | 5/2013 | Kato et al. |

FOREIGN PATENT DOCUMENTS

| | | |
|---|---|---|
| JP | 2008-162095 A | 7/2008 |
| JP | 2008-254358 A | 10/2008 |
| JP | 2010-284951 A | 12/2010 |

OTHER PUBLICATIONS

Japanese Office Action dated Jul. 15, 2014 with an English translation thereof.

* cited by examiner

*Primary Examiner* — Manish S Shah
*Assistant Examiner* — Jeffrey C Morgan
(74) *Attorney, Agent, or Firm* — McGinn IP Law Group, PLLC.

(57) ABSTRACT

An image forming apparatus configured to form a plurality of dots on a recording medium by ejecting ink droplets includes: a recording head configured to eject the ink droplets of a plurality of colors including similar colors, which are colors of which densities or hues are equal to each other; a transporting unit configured to relatively move the recording head and the recording medium; a head driving circuit configured to perform a driving control of the recording head based on a control signal; and an image processing unit configured to convert an input image signal into a control signal to be supplied to the head driving circuit in a manner so that the dots of the similar colors are formed to be overlapped at a same position at a lower rate in a low density gradation range and at a higher rate in a high density gradation range.

14 Claims, 16 Drawing Sheets

FIG. 8A
FIG. 8B
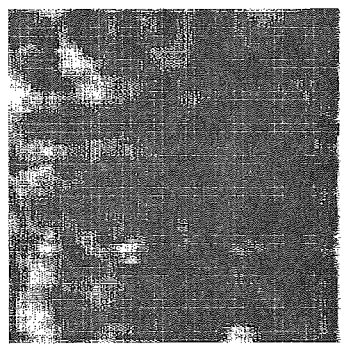
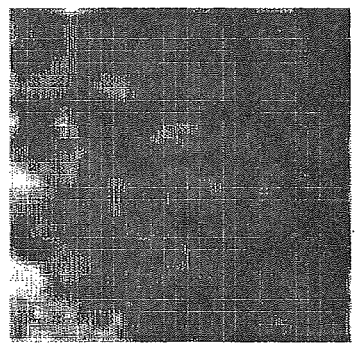
FIG. 8C
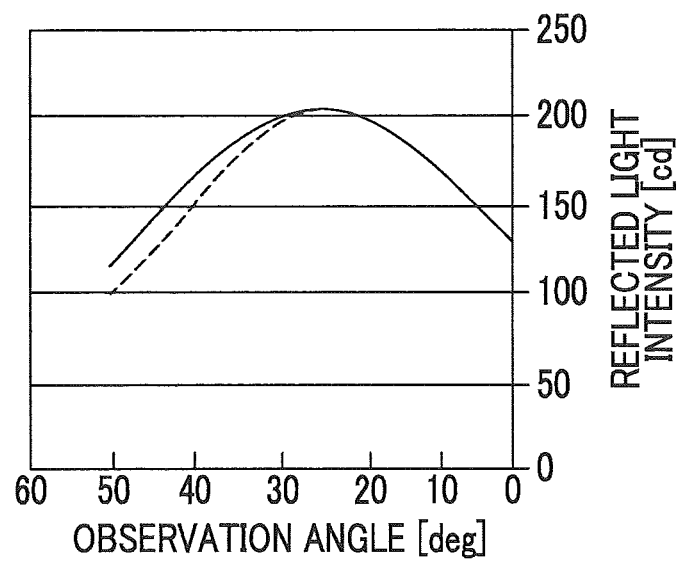

FIG. 10

| | DROPLET EJECTION FORM | EVALUATION ITEMS AND RESULTS | | | | |
|---|---|---|---|---|---|---|
| | | GLOSS BANDING | COLOR UNEVENNESS | GRAINI-NESS | DENSITY UNEVENNESS | OVERALL EVALUATION |
| COMPARATIVE EXAMPLE | · NO OVERLAP EJECTION | C | A | A | D | SECOND GRADE |
| PRESENT EXAMPLE | · C AND Lc OVERLAP EJECTION<br>· M AND Lm OVERLAP EJECTION | B | A | B | C | FIRST GRADE |
| FIRST REFERENCE EXAMPLE | · C AND Lm OVERLAP EJECTION<br>· M AND Lc OVERLAP EJECTION | B | E | B | C | FOURTH GRADE |
| SECOND REFERENCE EXAMPLE | · C, M, Lc AND Lm OVERLAP EJECTION | A | E | B | C | THIRD GRADE |

IMAGE FORMING APPARATUS AND IMAGE FORMING METHOD

BACKGROUND OF THE INVENTION

1. Field of the Invention

The present invention relates to an image forming apparatus which forms multiple dots on a recording medium by ejecting ink droplets including a pigment as a colorant, and an image forming method using the apparatus.

2. Description of the Related Art

Recently, according to a rapid progress of an ink jet technology, it is possible to perform a large size color printing which enables both a high speed and a high image quality using an image forming apparatus of an ink-jet method. Particularly, the apparatus is used in various fields in sign and display applications, and it is also possible to be applied to printing of an over-the-counter point of purchase (POP) advertisement or a poster, outdoor advertisement, a billboard or the like. It is possible to obtain printed materials in the ink-jet method, by forming multiple dots by ejecting multiple types of ink droplets on a recording medium. That is, it is possible to realize many colors on the recording medium by variously combining the dots with different size or color.

In the meantime, in a case where the ink including a pigment is used, since a particle diameter thereof is relatively large compared with dyes, inclusions such as the pigment are likely to remain on a recording surface. Particularly, there are problems that non-uniformity of gloss occurs in a gradation image, and as a result, an appearance (grade) of the image is degraded. This is because a concavo-convex shape occurs even in the same image due to discreteness and discontinuity of a dot arrangement rule. Thus, various image forming methods are proposed according to which the occurrence degree of gloss is approximately even in each density gradation range.

JP2010-284951A proposes controlling a surface smoothness of the image by changing a position where the ink droplets are applied. In FIG. 17 of JP2010-284951A, there is described that variation of the gloss over the whole density gradation range is decreased, by decreasing the surface smoothness (gloss) of the low density gradation range.

In JP2008-162095A, there is described that a mask pattern with high (or low) dot dispersiveness for each path is used, with respect to an ink combination with higher (or lower) gloss during image recording.

SUMMARY OF THE INVENTION

According to research and survey of the present inventors, the inventors have formed a screen tint image (halftone solid image) in a high density gradation range, and found out that gloss banding is generated by a combination of an apparatus and ink. This result means that a surface smoothness is locally damaged even in an image with a regular dot arrangement, based on an image forming process such as transport accuracy of a recording medium and physicality of pigment ink.

However, in apparatuses and methods disclosed in JP2010-284951A and JP2008-162095A, the discussed problem is just a non-uniformity of gloss between different densities, and there is no description with regard to the non-uniformity of the gloss in a screen tint image. In addition, any solution for this new issue is not proposed even by the apparatuses or the like described in JP2010-284951A and JP2008-162095A.

The present invention is made in view of the problems described above, and provides an image forming apparatus and an image forming method that is capable of suppressing the occurrence of gloss banding in a screen tint image due to an image forming process.

An image forming apparatus according to an aspect of the disclosed invention is configured to form a plurality of dots on a recording medium by ejecting ink droplets including a pigment as a colorant. The image forming apparatus includes: a recording head configured to eject the ink droplets of a plurality of colors including similar colors, which are colors of which densities or hues are equal to each other; a transporting unit configured to relatively move the recording head and the recording medium by transporting at least one of the recording head and the recording medium in a predetermined transport direction; a head driving circuit configured to perform a driving control of the recording head based on a control signal while the recording head and the recording medium are relatively moved by the transporting unit so as to sequentially form each dot and thereby generating an image; and an image processing unit configured to convert an input image signal into a control signal to be supplied to the head driving circuit in a manner so that the dots of the similar colors are formed to be overlapped at a same position at a lower rate in a low density gradation range and at a higher rate in a high density gradation range.

Thus, the image processing unit is provided, which is configured to convert the input image signal into the control signal to be supplied to the head driving circuit in a manner so that the dots of the similar colors are formed to be overlapped in a same position at a lower rate in the low density gradation range and at a higher rate in the high density gradation range, thereby forming the image in which the surface smoothness is higher in the low density gradation range and the surface smoothness is lower the high density gradation range.

By suppressing the surface smoothness of the image in the high density gradation range, an ideally obtained gloss is decreased, but the robustness with respect to the local degradation of the surface smoothness due to the image forming process is increased. As a result, it is possible to suppress the generation of the gloss banding on the screen tint image due to the image forming process.

In addition, since the number of dots formed on the recording medium in the low density gradation range is small, the influence of the gloss banding due to the image forming process is relatively small. Thus, the noise and graininess of the image is decreased by forming the dots of the similar colors to be overlapped a same position at a lower rate.

In addition, the image processing unit may include: a color conversion processing unit configured to perform a color conversion processing with respect to the input image signal and thereby obtain a device color signal for each color channel according to the plurality of colors; and a halftone processing unit configured to performs halftone processing with respect to each of the device color signals obtained by the color conversion processing unit, using a systematic dithering method which uses different threshold value matrixes depending on each color of the similar colors.

Furthermore, the different threshold value matrixes may include a reference threshold value matrix and another threshold value matrix obtained by sequentially shifting a threshold value of each matrix element of the reference threshold value matrix. Thus, degree of the overlap of the dots between the similar colors can be easily changed.

Furthermore, the similar colors may include a dark color and a light color which have the same hue as each other and a different density from each other, and the color conversion processing unit may perform the color conversion processing in a manner so that the number of the light color dots is greater than the number of the dark color dots, in an arbitrary medium density gradation range.

According to another aspect of the disclosed invention, there is provided an image forming method for forming a plurality of dots on a recording medium by ejecting ink droplets including a pigment as a colorant, by using an image forming apparatus that includes: a recording head configured to eject the ink droplets with a plurality of colors including similar colors, which are colors of which densities or hues are equal to each other; a transporting unit configured to relatively move the recording head and the recording medium by transporting at least one of the recording head and the recording medium in a predetermined transport direction; and a head driving circuit configured to perform a driving control of the recording head based on a control signal while the recording head and the recording medium are relatively moved by the transporting unit so as to sequentially form each dot and thereby generating an image. The method includes a step of converting an input image signal into a control signal to be supplied to the head driving circuit in a manner so that the dots of the similar colors are formed to be overlapped at a same position at a lower rate in a low density gradation range and at a higher rate in a high density gradation range.

According to the image forming apparatus and the image forming method of the disclosed invention, the image processing unit is provided which converts the input image signal into the control signal to be supplied to the head driving circuit, in a manner so that the dots of the similar colors are formed to be overlapped in a same position at a lower rate in the low density gradation range and at a higher rate in the high density gradation range, thereby forming the image in which the surface smoothness is higher in the low density gradation range and the surface smoothness is lower in the high density gradation range.

By suppressing the surface smoothness of the image in the high density gradation range, an ideally obtained gloss is decreased, but the robustness with respect to the local degradation of the surface smoothness due to the image forming process is increased. As a result, it is possible to suppress the generation of the gloss banding on the screen tint image due to the image forming process.

In addition, since the number of dots formed on the recording medium in the low density gradation range is small, the influence of the gloss banding due to the image forming process is relatively small. Thus, the noise and graininess of the image is decreased by forming the dots of the similar colors be overlapped in a same position at a lower rate.

BRIEF DESCRIPTION OF THE DRAWINGS

FIGS. 8A and 8B are enlarged views of height images which visualize a concavo-convex shape of a screen tint image which is formed by using the image forming method according to a comparative example. FIG. 8C is a graph illustrating angular distribution characteristics of a reflected light intensity.

FIG. 10 is a view illustrating sensory evaluation results of each screen tint image.

DESCRIPTION OF THE PREFERRED EMBODIMENTS

Hereinafter, preferred embodiments of an image forming method will be described in detail with reference to the accompanying drawings in relation to an image forming apparatus which performs the image forming method. In addition, in the present disclosure, a formation of an image may be referred to as "printing".

<Characteristics of Image Forming Method According to the Present Embodiments>

Figure 1A:
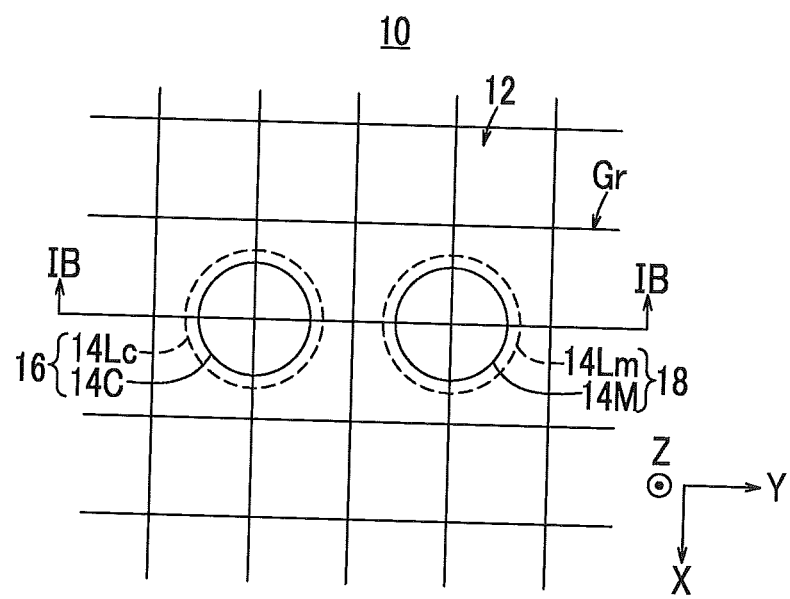
FIG. 1A is a schematic plan view illustrating a first state of each dot which is formed on a recording medium using an image forming method according to the present embodiment.
Figure 1B:
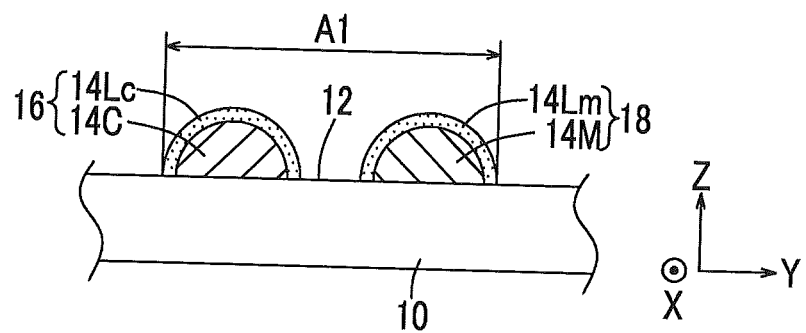
FIG. 1B is a schematic cross-sectional view which is taken along a line IB-IB in FIG. 1A.

FIG. 1A is a schematic plan view illustrating a first state of each dot which is formed on a recording medium 10 using an image forming method according to the present embodiment. FIG. 1B is a schematic cross-sectional view which is taken along a line IB-IB in FIG. 1A. In addition, in FIG. 1A, each grid point of square lattices Gr which are formed in X direction and Y direction respectively illustrate a target position at which each dot can be formed.

As illustrated in FIGS. 1A and 1B, dots of two types of similar colors are formed respectively on a recording surface 12 of the recording medium 10. The "similar colors" in the present disclosure refer to colors of which densities or hues are equal to each other. In FIGS. 1A and 1B, dots of a "cyan system" and a "magenta system", more particularly, a dot 14C of a cyan (C) color, a dot 14Lc of a light cyan (LC) color, a dot 14M of a magenta (M) color, and a dot 14Lm of a light magenta (LM) color are arranged.

Each dot 14C, 14Lc, 14M, and 14Lm is formed by ejecting ink droplets towards the recording medium 10 and depositing the ink droplets on the recording surface 12. The ink droplets include colorants which have a relatively low penetration into the recording medium 10, for example, pigments. Dots which are laminated in Z direction (hereinafter, referred to as "lamination dots 16") are formed by sequentially depositing the dots 14C and 14Lc of the cyan system at the same position. In the same manner, the lamination dots 18 are formed by sequentially depositing the dots 14M and 14Lm of the magenta system at the same position. Hereinafter, a droplet ejecting method which forms the lamination dots 16 and 18 by sequentially depositing the dots at the same position will be referred to as "overlap ejection".

In addition, in the present disclosure, "dots being formed at the same position" indicates that the target positions to which the ink droplets are to be applied are same with each other, and also includes a case where "dots are formed substantially at the same position" as a result of the deposition position being shifted from the target position due to various error factors.

Figure 2A:
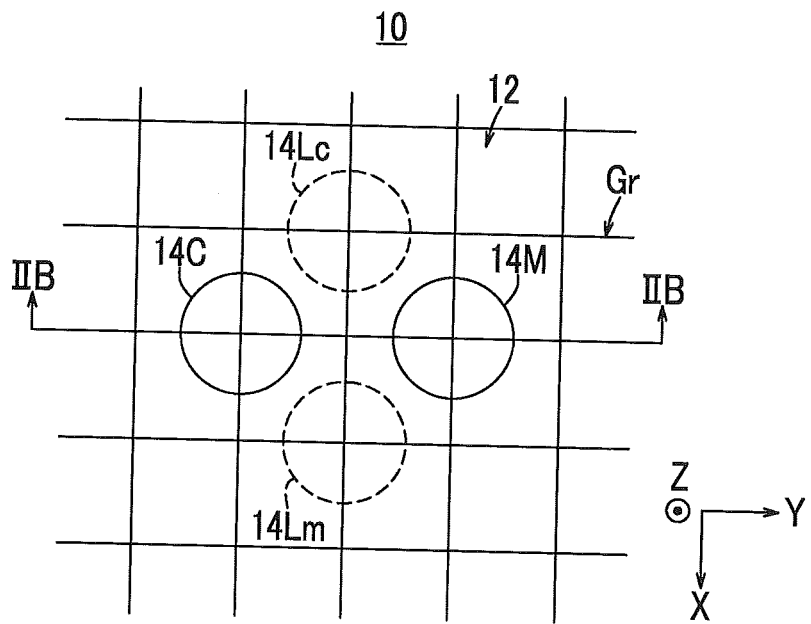
FIG. 2A is a schematic plan view illustrating a second state of each dot which is formed on the recording medium using the image forming method according to the present embodiment.
Figure 2B:
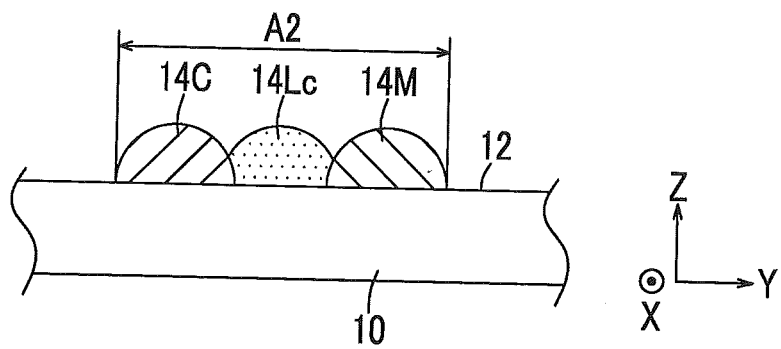
FIG. 2B is a schematic cross-sectional view which is taken along a line IIB-IIB in FIG. 2A.

FIG. 2A is a schematic plan view illustrating a second state of each dot which is formed on the recording medium 10 using the image forming method according to the present embodiment. FIG. 2B is a schematic cross-sectional view which is taken along a line IIB-IIB in FIG. 2A. In addition, in FIG. 2A, each grid point of the square lattices Gr which are formed in the X direction and the Y direction respectively illustrate a target position at which each dot can be formed, in the same manner as illustrated in FIG. 1A.

As illustrated in FIGS. 2A and 2B, dots of two types of similar colors are formed respectively on the recording surface 12 of the recording medium 10. This second state is different from the first state (refer to FIGS. 1A and 1B) in that each of the dots 14C, 14Lc, 14M, and 14Lm is deposited at a position different from one another. Hereinafter, the droplet ejecting method which forms each dot 14C, 14Lc, 14M and 14Lm by sequentially depositing the dots at different position with one another will be referred to as "shift ejection".

In addition, in the present disclosure, "dots being formed at different positions" indicates that the target positions to which the ink droplet are to be applied are different from each other, and does not include a case where "dots are formed in different positions" as a result of the deposition position being shifted from the target position due to various error factors.

As can be understood from FIGS. 1B and 2B, a surface roughness in a first area A1 is greater than a surface roughness in a second area A2. In other words, a surface smoothness in the second area A2 is better than a surface smoothness in the first area A1. As a result, a specular reflectivity of the second area A2 is higher than that of the first area A1.

<Configuration and Operation of Image Processing Unit 20>

Figure 3:
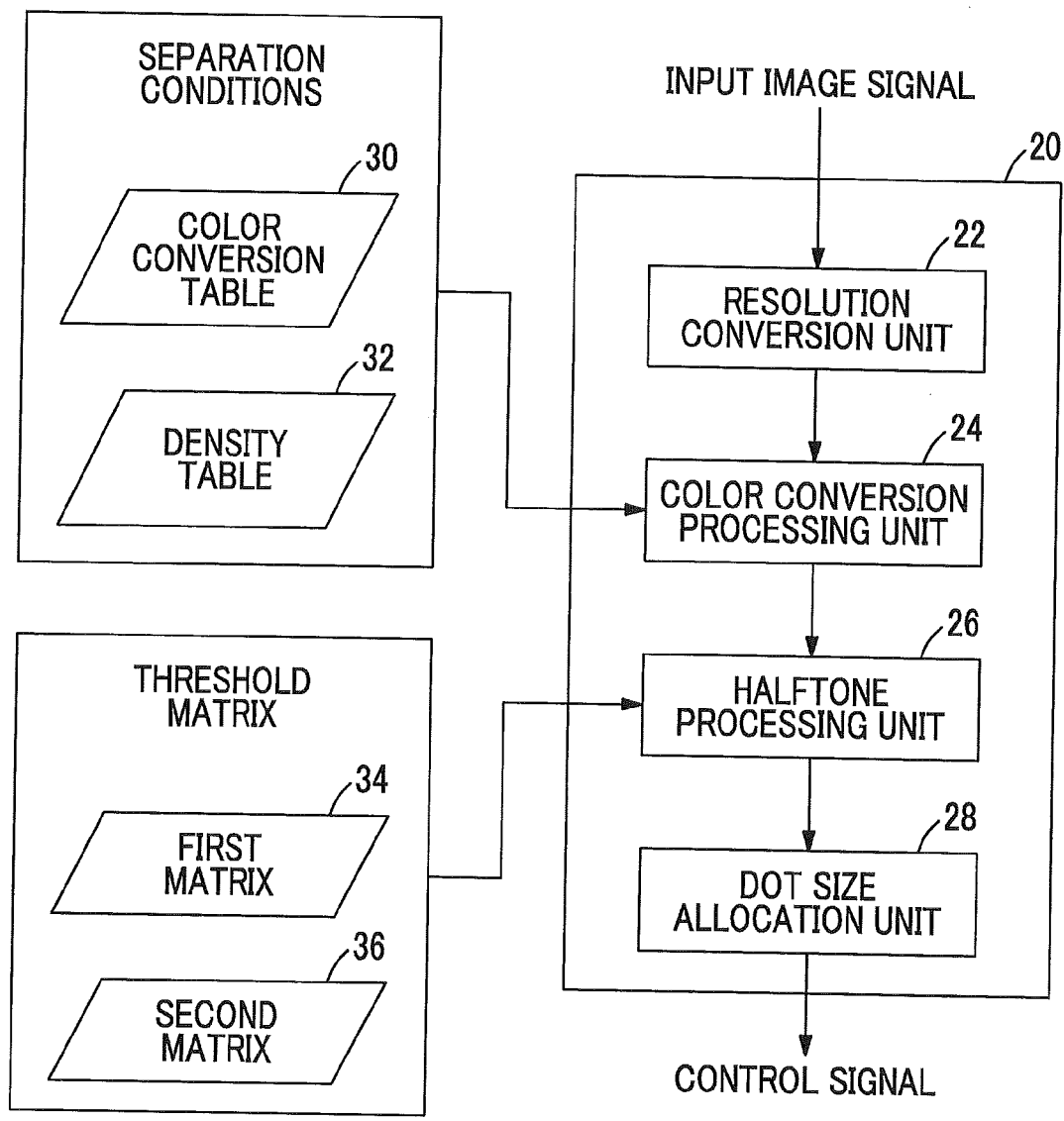
FIG. 3 is a functional block diagram of an image processing unit according to the present embodiment.

FIG. 3 is a functional block diagram of the image processing unit 20 according to the present embodiment. The image processing unit 20 basically includes a resolution converting unit 22, a color conversion processing unit 24, a halftone processing unit 26 and a dot size allocation unit 28.

An image signal which is input to the image processing unit 20 (hereinafter, referred to as an input image signal) is multi-gradation data with multiple color channels. For example, the image signal may be TIFF type data of 8 bit (256 gradations per a pixel) RGB.

The resolution converting unit 22 converts a resolution of the input image signal into a resolution depending on the image forming apparatus 100 (refer to FIG. 12 or the like) by using an image expansion and contraction processing which expands or contracts an image size, and thereby obtain a first intermediate signal. The obtained first intermediate image signal has the same data definition as that of input image signal, but the data sizes thereof are different with each other. As the image expansion and contraction processing, various known algorithms including an interpolation calculation may be applied.

Figure 12:
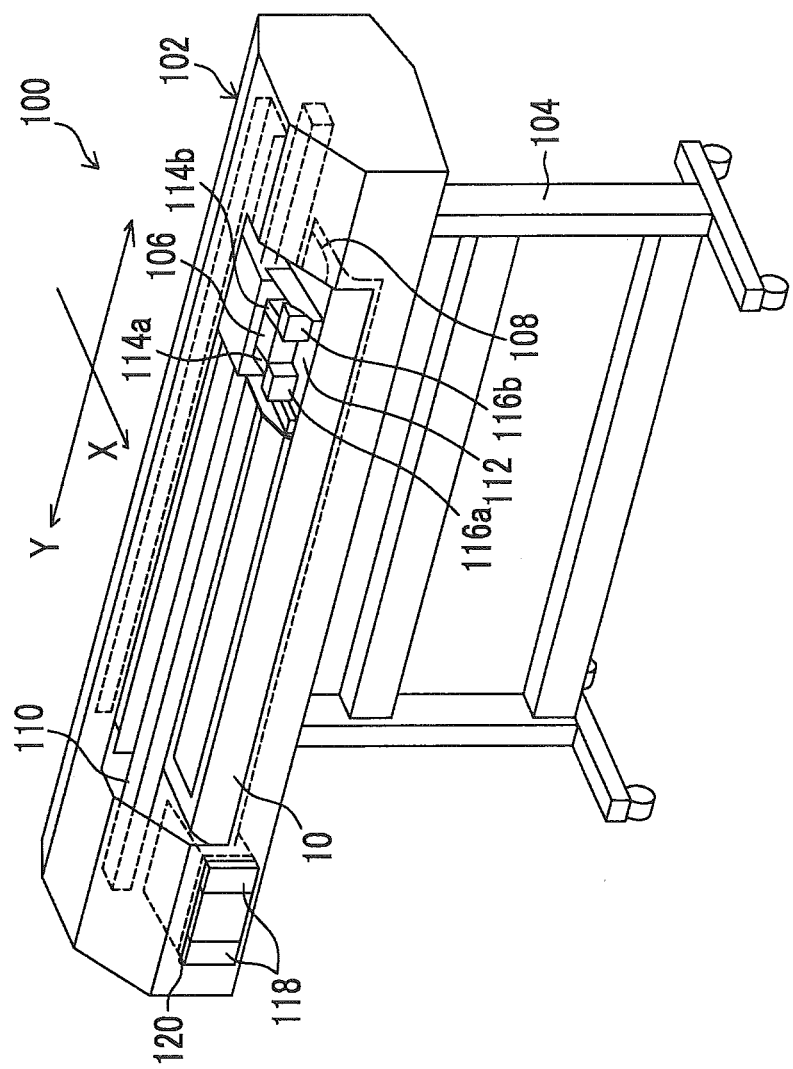
FIG. 12 is an external perspective view of an image forming apparatus according to the present embodiment.

The color conversion processing unit 24 converts the first intermediate image signal which is obtained from the resolution converting unit 22 into a device color signal (i.e., a second intermediate image signal), which is treated in the image forming apparatus 100 (refer to FIG. 12 or the like). Specifically, the color conversion processing unit 24 converts an RGB color signal into a CMYK signal, by reading and referring a stored color conversion table 30. Subsequently, the color conversion processing unit 24 analyzes (separates) the device color signal of a particular color channel (for example, cyan) into a signal for each color channel of the similar colors, by reading and referring a stored density table 32.

Figure 4:
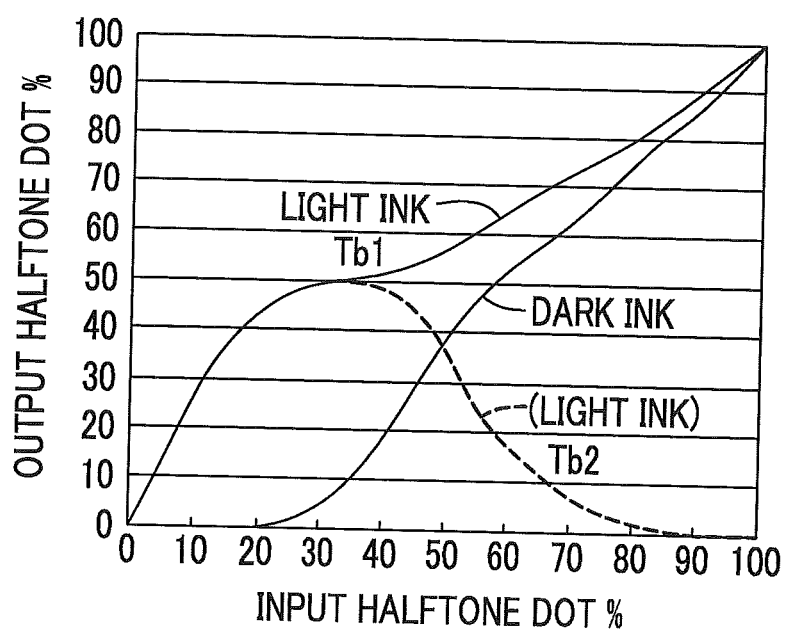
FIG. 4 is a graph illustrating an example of a characteristics curve of a density table according to the present embodiment.

FIG. 4 is a graph illustrating an example of a characteristics curve of the density table 32 according to the present embodiment. Horizontal and vertical axes of the graph are gradation levels (unit: %) which are denoted as a percentage. Here, in order to easily distinguish each value, the horizontal axis is referred to as "input halftone dot %" and the vertical axis is referred to as "output halftone dot %". In FIG. 4, the characteristics curves of a dark color (dark ink) and light color (light ink) are denoted together. Here, a "dark color" and a "light color" have a relationship in which both colors have the same hue and different density, and the "dark color" means a color having a higher density.

With respect to the characteristics curve of the dark ink, in a range where a value of the input halftone dot % is 0 to 20%, a value of the output halftone dot % is always 0. Then, in a range where the value of the input halftone dot % exceeds 20%, the value of the output halftone dot % increases approximately in proportion to an increase of the input halftone dot %. With respect to the characteristics curve (Tb1) of the light ink, in a range where a value of the input halftone dot % is 0 to 35%, the value of the output halftone dot % simply increases according to the increase of the input halftone dot %. Then, in a range where the value of the input halftone dot % exceeds 35%, the value of the output halftone dot % substantially linearly increases according to the increase of the input halftone dot %.

As illustrated in FIG. 4, except the maximum value (0%) and the minimum value (100%) of the input halftone dot %, the output halftone dot % of the light color has a value greater than the output halftone dot % of the dark color. That is, the color conversion processing unit 24 performs color conversion processing in such a manner that the number of dots of the light colors (Lc, Lm) may be greater than the number of the dots of the dark color (C, M), by using the density table 32, in an arbitrary medium density gradation range except for 0% and 100%.

In the meantime, in conventional the image forming method, the density table is provided in such a manner that the light ink is replaced with the dark ink within a medium to high density gradation range. That is, the characteristics curve (Tb2) of the light ink, as illustrated by a broken line, has a mountain-like shape so that the output halftone dot % may be a peak value when the input halftone dot % is 35% and may be 0 when the input halftone dot % is 90%.

The obtained second intermediate image signal corresponds to the multi-gradation device color signal. For example, the multi-gradation device color signal may include, for example, the device color signal for six color channels which are yellow (Y), magenta (M), cyan (C), black (K), light cyan (LC), and light magenta (LM).

The halftone processing unit 26 illustrated in FIG. 3 converts the second intermediate image signal which is obtained from the color conversion processing unit 24 into ON and OFF signals of the dot. In the halftone processing, a systematic dithering method, an error diffusion method, a density pattern method, a random dot method or the like may be applied. In the present embodiment, halftone processing using the systematic dithering method will be mainly described.

Figure 5:
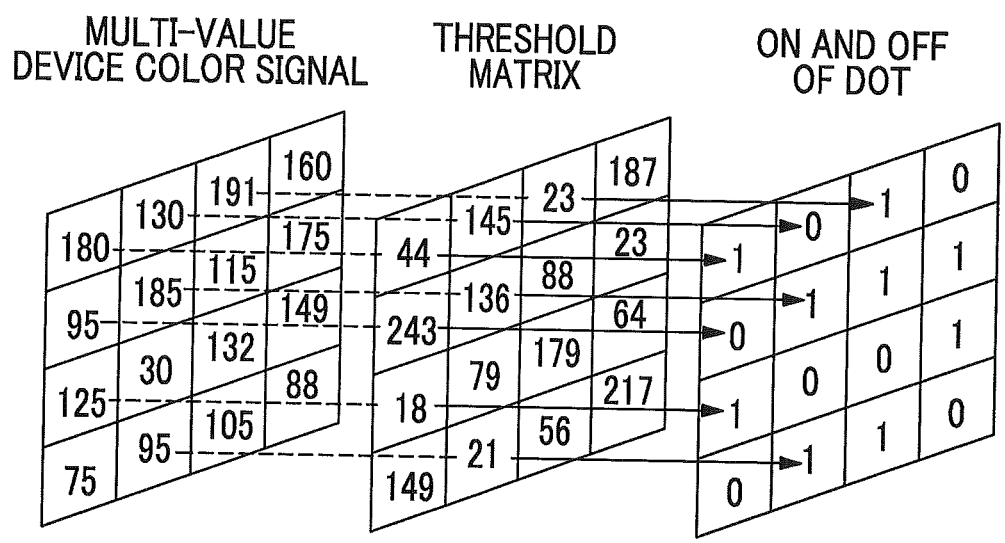
FIG. 5 is a schematic explanatory view of a halftone processing using a systematic dithering method.

FIG. 5 is a schematic explanatory view of the halftone processing using the systematic dithering method. As an example, a concept of binarization using a threshold value matrix (matrix pattern) of Bayer type is illustrated. First, each address of multi-value device color signals and each matrix element of the threshold value matrixes are associated with each other. Then, each magnitude relationship between a pixel value of a focused pixel and a threshold value of a focused matrix element is compared. If the pixel value is larger than the threshold value of the corresponding matrix element, "1 (ON)" is assigned, and in other cases, "0 (OFF)" is assigned. Thus, the gradation value of the image signals is converted from multi-values to binary values.

Figure 6A:
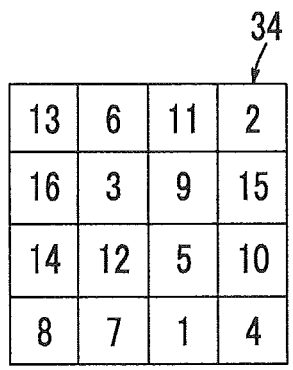
FIG. 6A is a schematic explanatory view illustrating an example of matrix elements of a first matrix.
Figure 6B:
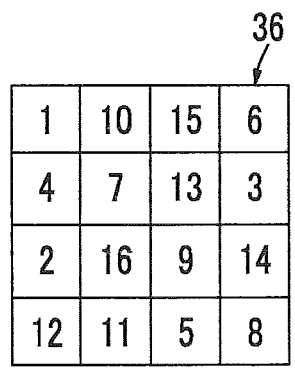
FIG. 6B is a schematic explanatory view illustrating an example of matrix elements of a second matrix.

FIG. 6A is a schematic explanatory view illustrating an example of matrix elements of a first matrix 34. FIG. 6B is a schematic explanatory view illustrating an example of matrix elements of a second matrix 36. Each number means a threshold value (gradation level) in each matrix element. A first matrix 34 and a second matrix 36 have the same size each other (in FIGS. 6A and 6B, a 4 by 4 square).

As can be understood from FIGS. 6A and 6B, arrangements of the threshold values of the sixteen matrix elements are different from one another. When the threshold values of certain matrix elements in the first matrix 34 and the second matrix 36 are referred to as Th1 and Th2, respectively, a relationship of Th2=1+{(Th1+3)mod16} in arbitrary matrix elements is satisfied. In such case, i) when the gradation level n is 1≤n≤4, the number of duplicates of "1" between the two matrixes is zero, ii) when the gradation level n is 4<n≤12, the number of duplicates of "1" between the two matrixes is (n−4), and iii) when the gradation level n is 12<n≤16, the number of duplicates of "1" between the two matrixes is 2(n−8).

The threshold value of each matrix element in the second matrix 36 is a value obtained by permutationally (i.e., sequentially) shifting the threshold value of each matrix element in the first matrix 34, and thus the number of duplicates of "1 (ON)" between the two matrixes, i.e., duplication degree of the dots of the similar colors can be varied in a simple manner. A generation method of the threshold value matrix is not limited to that as described, and various methods may be used.

In addition, the halftone processing unit 26 converts the second intermediate image signal into the ON or OFF signal of the dot, by executing the systematic dithering method which uses the threshold value matrixes, which are different from each other for each color of the similar colors. For example, the first matrix 34 is applied for C (or M), and the second matrix 36 is applied for LC (or LM).

The dot size allocation unit 28 illustrated in FIG. 3 allocates the dot size to each position of the pixels which are in an ON state (a pixel value is one) among multiple pixels indicated by the binary image signal obtained from the halftone processing unit 26.

Figure 13:
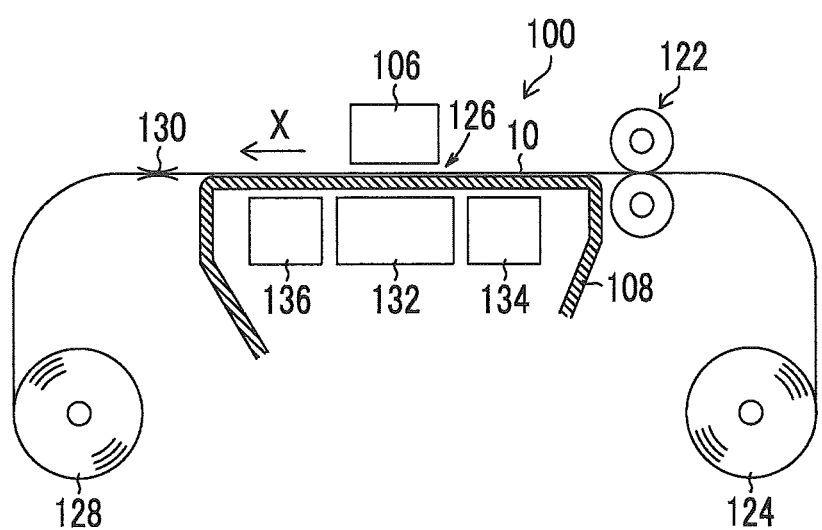
FIG. 13 is an explanatory view schematically illustrating a transport path of the recording medium in the image forming apparatus illustrated in FIG. 12.

The dot size allocation unit 28 properly allocates any one of "large size", "medium size", and "small size", with respect to each pixel which is in the ON state indicated by the binary image signal, thereby generating a control signal (a signal used for control of the recording head 106 illustrated in FIG. 13 or the like) for a proper ejection control of the ink droplets. The control signal obtained in this manner is multi-value data for each color which controls presence or absence (ON or OFF) of an ink ejecting operation, or an amount of the ink droplets which are ejected in a time sequence, with respect to the recording head 106. For example, the multi-level "0" indicates an OFF state, the multi-level "1" indicates an ON state (small size), the multi-level "2" indicates an ON state (medium size), and the multi-level "3" indicates an ON state (large size).

Figure 7:
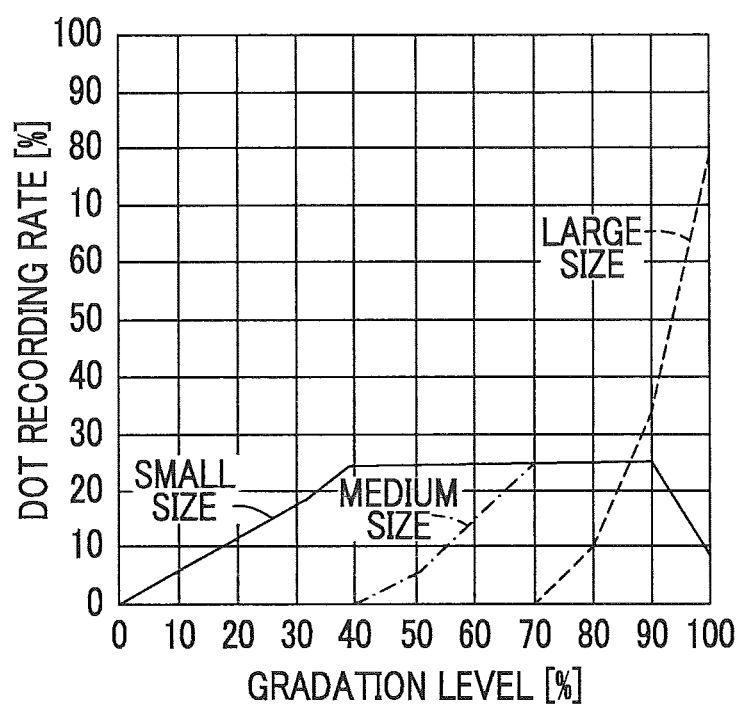
FIG. 7 is a graph illustrating an example of allocation characteristics of multiple dot sizes in a dot size allocation unit which is illustrated in FIG. 3.

FIG. 7 is a graph illustrating an example of allocation characteristics of multiple dot sizes in the dot size allocation unit 28 which is illustrated in FIG. 3. A horizontal axis of the graph is a gradation level (unit: %) which is denoted as a percentage. A vertical axis of the graph is a dot recording rate (unit: %). This "dot recording rate" means a rate (0 to 100%) of the number of recorded dots with respect to the maximum number of formable dots.

Figure 16:
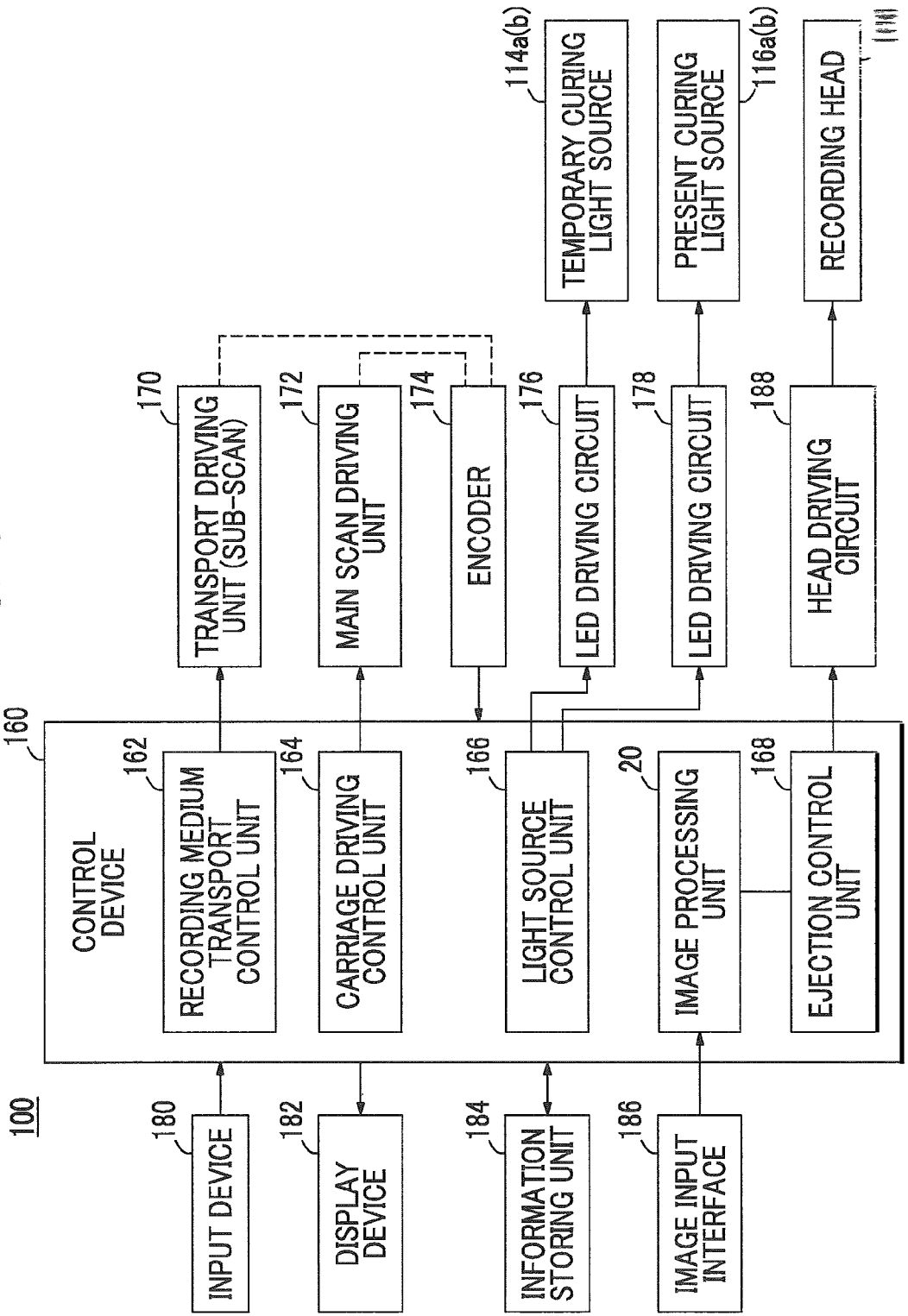
FIG. 16 is a block diagram illustrating a configuration of the image forming apparatus.

In the present embodiment, it is possible to form three types of dots, which are "large size", "medium size", and "small size", using the ejection control of an ejection control unit 168 (refer to FIG. 16). In addition, the formable dot size is not limited to three types, and may be two types or may be more than four types.

As illustrated in this graph, the dot recording rate of the small size simply increases in a range where the gradation level is 0 to 40%, is constant (approximately 25%) in a range where the gradation level is 40 to 90%, and simply decreases in a range where the gradation level is 90 to 100%. The dot recording rate of the "medium size" is 0% in a range where the gradation level is 0 to 40%, simply increases in a range where the gradation level is 40 to 70%, is constant (approximately 25%) in a range where the gradation level is 70 to 90%, and simply decreases in a range where the gradation level is 90 to 100%. The dot recording rate of the "large size" is 0% in a range where the gradation level is 0 to 70%, and simply increases in a range where the gradation level is 70 to 100%. As a result, a high quality image with suppressed graininess is obtained by using only the dot of the small size in a low density gradation range.

The image processing by the image processing unit 20 illustrated in FIG. 3 ends as described above. Subsequently, the ink droplets of each color are ejected based on the control signal output from the image processing unit 20, and a desired image is formed on the recording medium 10. As a result, in the low density gradation range (gradation level is approximately 0 to 30%), as illustrated in FIGS. 2A and 2B, the image with "shift-ejected" dots 14C and 14Lc (or the dots 14M and 14Lm) of the similar colors is formed. In the same manner, in the high density gradation range (gradation level is approximately 70 to 100%), as illustrated in FIGS. 1A and 1B, the image with overlap-ejected dots 14C and 14Lc (or the dots 14M and 14Lm) of the similar colors is formed.

<Effects of the Image Forming Method>

Hereinafter, effects obtained by the image forming method according to the present embodiment will be described with reference to FIGS. 8A to 10.

<<Description of Sample Image>>

Four types of image processing was performed with respect to the screen tint image (halftone solid image) equivalent to C=40% and M=40% in CMYK data, and thereby each sample image was prepared. As a "comparative example", the image processing was performed in such a manner that the dots 14C and 14Lc and the like be arranged in a state as illustrated in FIGS. 2A and 2B (i.e., the shift ejection). As a "present example", the image processing was performed in such a manner that the dots of similar colors, i.e., the dots of 14C and 14Lc overlap to each other and the dots of 14M and 14Lm overlap. As a "first reference example", the image processing was performed in such a manner that the dots of 14C and 14Lm, which are not similar colors, overlap to each other and the dots of 14M and 14Lc overlap. As a "second reference example", the image processing was performed in such a manner that the dots of 14C, 14Lm, 14M, and 14Lc be overlapped.

<<Analysis Result of Sample Image>>

FIGS. 8A and 8B are enlarged views of height images which visualize a concavo-convex shape of the screen tint image which is formed by using the image forming method according to the comparative example. FIG. 8A is a portion of the image area equivalent to a first swath, and FIG. 8B is a portion of the image area equivalent to a second swath. In each height image which is illustrated in FIGS. 8A and 8B, and FIGS. 9A and 9B described below, the darker the image appears, the higher the height of a surface position (Z direction of FIG. 1A or the like) is, while the lighter the image appears, the lower the height of the surface position is.

FIG. 8C is a graph illustrating angular distribution characteristics of a reflected light intensity. The horizontal axis of the graph is an observation angle (unit: deg), and the vertical axis of the graph is a reflected light intensity (unit: cd). In addition, this graph illustrates an actual measurement result using a commercial goniophotometer. More specifically, the graph illustrates a measurement value of the image illustrated in FIG. 8A as a solid line, and illustrates the measurement value of the image illustrated in FIG. 8B as a dashed line. As illustrated in FIGS. 8A and 8B, the measurement values of both images are approximately same within a range where the observation angle is 0 to 25 deg, but in a case where the observation angle exceeds 25 deg, divergence of each measurement value occurs. In other words, even within the screen tint image of the high density gradation range, non-uniformity of gloss (gloss banding) for each swath occurs. Such gloss banding could be caused by the surface smoothness being locally damaged due to an image forming process such as transport accuracy of the recording medium 10 and physical properties of the pigment ink.

Figure 9A:
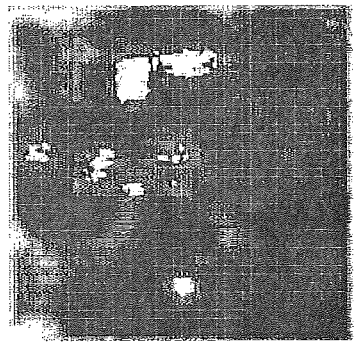
FIGS. 9A and 9B are enlarged views of height images which visualize a concavo-convex shape of a screen tint image which is formed by using the image forming method according to a practical example.
Figure 9B:
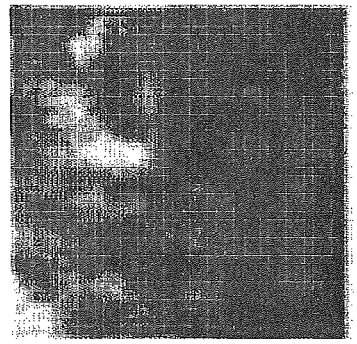
Figure 9C:
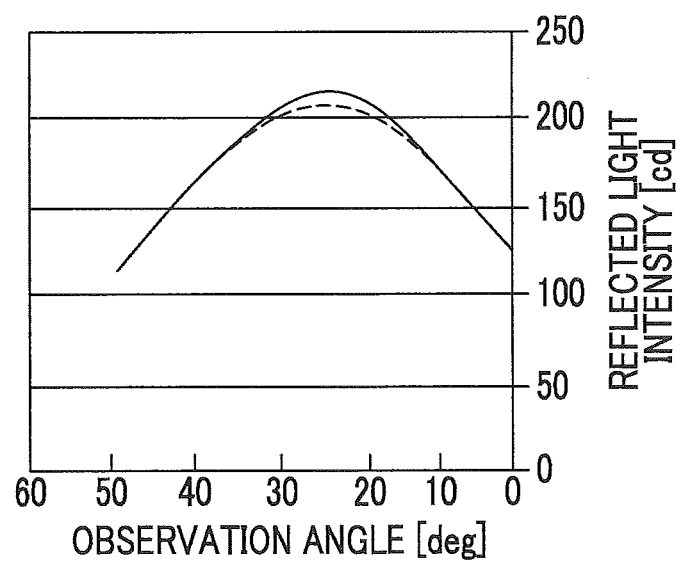
FIG. 9C is a graph illustrating the angular distribution characteristics of the reflected light intensity.

FIGS. 9A and 9B are enlarged views of height images which visualize a concavo-convex shape of a screen tint image which is formed by using the image forming method according to the present example. FIG. 9A is a portion of the image area equivalent to the first swath, and FIG. 9B is a portion of the image area equivalent to the second swath. FIG. 9C is a graph illustrating angular distribution characteristics of the reflected light intensity. This graph illustrates a measurement value of the image illustrated in FIG. 9A as a solid line, and illustrates the measurement value of the image illustrated in FIG. 9B as a dashed line.

As illustrated in FIG. 9C, the measurement values of both images are approximately same within a range where the observation angle is 0 to 50 deg, and the gloss for each swath is approximately constant. That is, occurrence of the gloss banding within the screen tint image of the high density gradation range is suppressed. The reason of the suppressed gloss banding will be described hereinafter.

In a case where the shift ejection is adopted, while the surface smoothness on the recording surface 12 (refer to FIG. 2B) of the image is excellent, the image is likely to be influenced by a local degradation of the surface smoothness due to the image forming process. As a result, the gloss non-uniformity for each swath occurs, and the gloss banding is likely to occur.

In contrast, in a case where the overlap ejection is adopted in the high density gradation range, the surface smoothness on the recording surface 12 (refer to FIG. 1B) of the image is reduced. In this case, while a gloss degree which is ideally obtained decreases, robustness with respect to the local degradation of the surface smoothness due to the image forming process increase. As a result, the occurrence of the gloss banding on the screen tint image due to the image forming process is suppressed.

<<Sensory Evaluation>>

Three researchers have observed each sample image of the comparative example, the present example, the first reference example, and the second reference example, and performed the sensory evaluation of image quality. Specifically, with regard to each image quality item of "gloss banding", "uneven color", the "graininess", and "uneven density", evaluation by five grades of A, B, C, D, and E was performed in a sequential order from high to low. In conjunction with this, the above-described four image quality items were integrally considered, and numbering was performed from high to low grade.

FIG. 10 is a view illustrating sensory evaluation results of each screen tint image. As the result of the integral evaluation, the high evaluation is obtained in the order of the present example, the comparative example, the second reference example, and the first reference example.

<<Supplementary Description>>

(1) In the examples of FIGS. 1A to 2B, the dots (for example, the dots 14C and 14Lc) with the same size are overlapped and formed, but it is possible to obtain the above-described effects even though the dots with different sizes are overlap-ejected. In the same manner, the dot of the light and dark colors of the similar colors may be applied to the recording medium in an arbitrary order. Also, the ink droplets with different size may be applied in an arbitrary order.

(2) It is possible to obtain the above-described effects regardless of whether the recording method is a single path method or a multi-path method. The single-path method is a recording method which generates an image by relatively moving the recording medium 10 along a predetermined straight line path only once, by using a line head which has multiple nozzles arranged in a width direction of the recording medium 10. The multi-path method is a recording method which generates the image by relatively moving the recording medium 10 along a transport direction of the recording medium 10 only once, while the recording head 106 is reciprocally scanned along the width direction of the recording medium 10, and can be realized by the image forming apparatus 100 (refer to FIG. 12) described below.

(3) Graininess for Each Gradation Level

Figure 11:
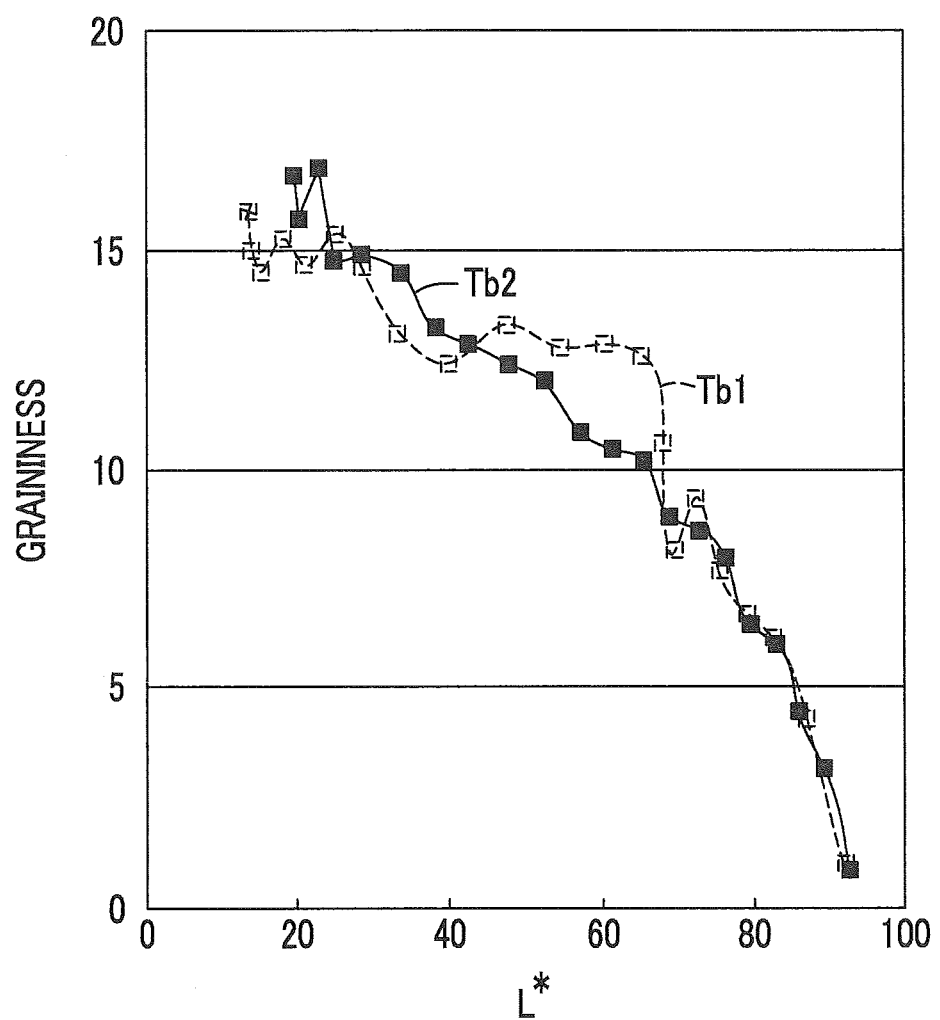
FIG. 11 is a graph illustrating graininess for each gradation level in a case where the density table illustrated in FIG. 4 is used.

FIG. 11 is a graph illustrating graininess for each gradation level in a case where the density table 32 illustrated in FIG. 4 is used. The horizontal axis of the graph is lightness L* (no unit), and the vertical axis of the graph is granularity (no unit). In this graph, an entire density gradation range (L*: approximately 20 to 90) is generally illustrated.

As can be understood from FIG. 11, even in a case where Tb1 is adopted as the density table of the light ink, the graininess in a case of Tb2 can be generally reproduced. That is, even in a case where the overlap ejection according to the present embodiment is performed, it is possible to suppress the degradation of the graininess by properly determining a dot arrangement method or the like.

<Entire Configuration of Image Forming Apparatus 100>

FIG. 12 is an external perspective view of an image forming apparatus 100 according to the present embodiment. The image forming apparatus 100 is a "wide format" printer, which forms a color image on the recording medium 10 by using ultraviolet curing type ink (UV curable ink). Here, the "wide format" printer means an apparatus corresponding to A3 size or greater.

The image forming apparatus 100 includes an apparatus body 102, and support legs 104 which support the apparatus body 102. In the apparatus body 102, a recording head 106 of drop-on-demand type which ejects ink towards the recording medium 10, a platen 108 which supports the recording medium 10, a guide mechanism 110 which is head moving means (scan means) and a carriage 112 are provided.

The guide mechanism 110 is orthogonal to the transport direction (X direction) of the recording medium 10 and arranged so as to be extended along a scan direction (Y direction) parallel to a medium supporting surface (a supporting surface of the recording medium 10) of the platen 108, above the platen 108. The carriage 112 is supported so as to be reciprocally movable towards the Y direction along the guide mechanism 110. On the carriage 112, the recording head 106 is mounted, and the temporary curing light sources 114a and 114b which radiate the ultraviolet to the ink on the recording medium 10, and the present curing light sources 116a and 116b are mounted.

The temporary curing light sources 114a and 114b are light sources which radiate the ultraviolet for temporarily curing the ink to the extent that the ink adjacent to each other does not coalescence, after the ink droplets ejected from the recording head 106 are landed on the recording medium 10. The present curing light sources 116a and 116b are light sources which radiates the ultraviolet for completely curing (present curing) the ink for the last time, after the temporary curing is performed and then additional exposure is performed.

The recording head 106 which is arranged on the carriage 112, the temporary curing light sources 114a and 114b, and the present curing light sources 116a and 116b move integrally with the carriage 112 along the guide mechanism 110. Hereinafter, there is a case where a reciprocal moving direction of the carriage 112 is referred to as "main scan direction", and the transport direction of the recording medium 10 (also simply referred to as "transport direction") is referred to as "sub-scan direction".

As the recording medium 10, various materials such as paper, nonwoven fabric, vinyl chloride, synthetic chemical fiber, polyethylene, polyester, and tarpaulin, and various media such as a permeable medium and non-permeable medium can be used. The recording medium 10 is fed in a roll paper state (refer to FIG. 13) from the rear side of the apparatus, and wound up in a winding roll 128 (refer to FIG. 12) in the front side of the apparatus after the printing. With respect to the recording medium 10 which is transported on the platen 108, the ink droplets are ejected from the recording head 106, and the ultraviolet is respectively radiated from the temporary curing light sources 114a and 114b, and the present curing light sources 116a and 116b with respect to the ink droplets attached on the recording medium 10.

A mounting unit 120 of the ink cartridge 118 is provided in front of a left side towards the front of the apparatus body 102. The ink cartridge 118 is a freely exchangeable ink supply source which stores the ultraviolet curing type ink. The ink cartridge 118 is provided corresponding to each color ink which is used in the image forming apparatus 100 illustrated in FIG. 12. Each of ink cartridges 118 having different colors from each other is connected to the recording head 106 through an ink supply path which is unillustrated and independently formed.

<Transport Path of Recording Medium 10>

FIG. 13 is an explanatory view schematically illustrating the transport path of the recording medium 10 in the image forming apparatus 100 illustrated in FIG. 13. As illustrated in FIG. 13, the platen 108 is formed in a reverse gutter shape, and an upper surface of the platen 108 becomes a support surface of the recording medium 10. Around the platen 108 and in an upstream side of the X direction, a pair of nip rollers 122 which are transporting means for intermittently transporting the recording medium 10 are disposed. The nip rollers 122 move the recording medium 10 in the X direction on the platen 108.

The recording medium 10 sent out from a roll (a sending supply roll 124) in the supply side which configures the transporting means using a roll-to-roll method is intermittently transported in the X direction by a pair of the nip rollers 122 provided in an inlet of a printing unit 126. The printing is performed by the recording head 106 on the recording medium 10 which reaches the printing unit 126 directly under the recording head 106, and the recording medium 10 is wound up on the winding roll 128 after the printing. In a downstream side in the X direction with respect to the printing unit 126, a guide member 130 which guides the recording medium 10 is provided.

A temperature control unit 132 for controlling temperature of the recording medium 10 during printing is provided in a rear surface (a surface opposite to the surface for supporting the recording medium 10) of the platen 108 in a position facing the recording head 106 in the printing unit 126. When the recording medium 10 is adjusted so as to be at a predetermined temperature during the printing, viscosity of the ink droplets land on the recording medium 10 or a physical property value of a surface tension or the like reaches a desired value, and it is possible to obtain a desired dot diameter. In addition, if necessary, a pre-temperature control unit 134 may be provided in the upstream side in the X direction with respect to the temperature control unit 132, and an after-temperature control unit 136 may be provided in the downstream side in the X direction with respect to the temperature control unit 132.

<Description of Recording Head 106>

Figure 14:
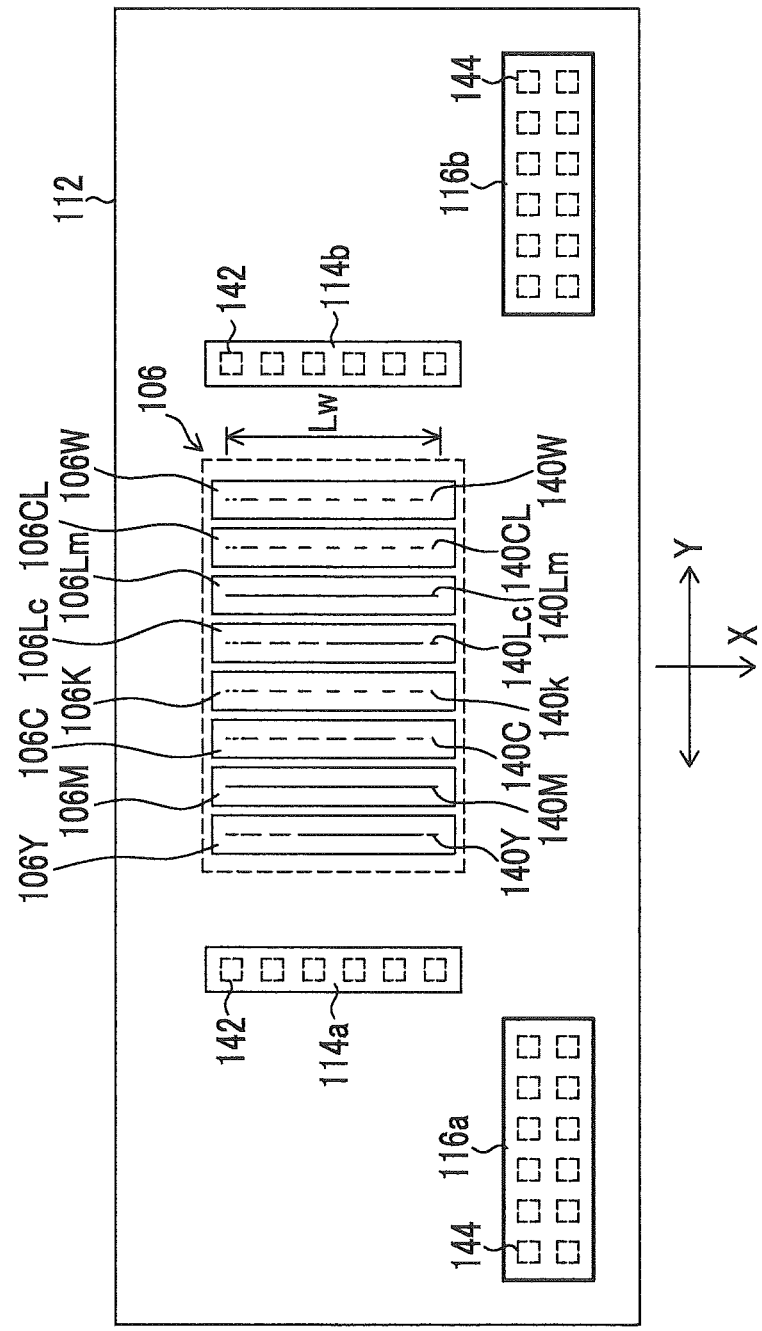
FIG. 14 is a perspective plan view illustrating an example of arrangement forms of a recording head which is arranged on a carriage illustrated in FIG. 12, temporary curing light sources, and present curing light sources.

FIG. 14 illustrates an example of arrangement forms of the recording head 106 which is arranged on the carriage 112, the temporary curing light sources 114a and 114b, and the present curing light sources 116a and 116b.

In the recording head 106, nozzle columns 140Y, 140M, 140C, 140K, 140Lc, 140Lm, 140CL, and 140W for ejecting color inks are respectively provided for ink of each color of yellow (Y), magenta (M), cyan (C), black (K), light cyan (LC), light magenta (LM), clear ink (C), and white (W). The nozzle columns are respectively illustrated by dashed lines in the FIG. 14, and an individual nozzle is not illustrated. In addition, hereinafter, the nozzle columns 140Y, 140M, 140C, 140K, 140Lc, 140Lm, 140CL, and 140W may be integrally referred to as nozzle columns 140.

The ink color type (number of colors) or color combination is not limited to the present embodiment. For example, a form in which the nozzle columns 140 of LC and LM are omitted, a form in which the nozzle columns 140 of CL or W is omitted, a form in which the nozzle columns 140 that ejects the ink with a special color is added, and the like are possible. In addition, an arrangement order of the nozzle columns 140 having different colors from each other is not limited as well.

A head module for each of the nozzle columns 140 having different colors from each other is configured, and by lining up this, it is possible to configure the recording head 106 which can form the color image or a monolog image. For example, it is possible to provide an embodiment in which each of the head modules 106Y, 106M, 106C, 106K, 106Lc, 106Lm, 106CL and 106W that respectively have the nozzle columns 140Y, 140M, 140C, 140K, 140Lc, 140Lm, 140CL and 140W that eject the ink with each of the colors Y, M, C, K, LC, LM, CL and W are arranged at equal intervals so as to line up along the reciprocation movement direction (Y direction) of the carriage 112. It is also possible to interpret each of the head modules (for example, the head module 106Y) having different colors from each other as "recording head". Alternatively, it is also possible to provide a configuration having nozzle columns in which the inks with multiple colors are ejected from one head, after ink flow paths are divided for different colors and formed inside one recording head 106.

Each nozzle column 140 is formed by the multiple nozzles arranged in one line along the Y direction at a constant interval. The recording head 106 according to the present examples has a nozzle arrangement pitch of 254 μm which configures each nozzle column 140, 256 nozzles which configure one line of nozzle columns 140, and an entire length of the nozzle columns 140 of about 65 mm (254 μm×255-64.8 mm). In addition, an ejection frequency is 15 kHz, and it is possible to divide the ejection amount into three types of 10 pl, 20 pl and 30 pl using driving waveform change.

As an ink ejection method of the recording head 106, a method (a piezo jet method) of flying the ink droplets using a change of a piezoelectric element (a piezo actuator) is adopted. As an ejection energy generating element, other than the form (electrostatic actuator method) using an electrostatic actuator, it is possible to adopt the form (a thermal jet method) which flies the ink droplets using a pressure, by heating the ink using a heat generator (a heating element) such as a heater and then generating bubbles.

<Description of Ultraviolet Radiating Apparatus>

As illustrated in FIG. 14, the temporary curing light sources 114a and 114b are arranged on both left and right sides of the scan direction (Y direction) of the recording head 106. Furthermore, the present curing light sources 116a and 116b are arranged in the downstream side of the transport direction (X direction) of the recording head 106.

The ink droplets which landed on the recording medium 10 ejected from the nozzle of the recording head 106 are radiated with the ultraviolet for temporary curing using the temporary curing light sources 114a and 114b which pass over the ink droplets immediately thereafter. In addition, the ink droplets on the recording medium 10 which pass through the printing unit 126 (refer to FIG. 13) in association with the intermittent transport of the recording medium 10 are radiated with the ultraviolet for the present curing using the present curing light sources 116a and 116b.

Each of the temporary curing light sources 114a and 114b has a structure in which multiple UV-LED elements 142 are arranged. The two temporary light sources 114a and 114b have the same structure as each other. The six UV-LED elements 142 are arranged so as to radiate the ultraviolet at a time with respect to an area with the same width as the entire length Lw of the nozzle column of the recording head 106.

Each of the present curing light sources 116a and 116b has a structure in which multiple UV-LED elements 144 are arranged. The two present light sources 116a and 116b have the same structure as each other. Each of the present curing light sources 116a and 116b has a shape in which six UV-LED elements 144 are arranged in the Y direction and two UV-LED elements 144 are arranged in the X direction.

In addition, the number of LED elements and the arrangement form of the temporary curing light sources 114a and 114b (or the present curing light sources 116a and 116b) are not limited to the example of FIG. 14.

<Description of Ink Supply System>

Figure 15:
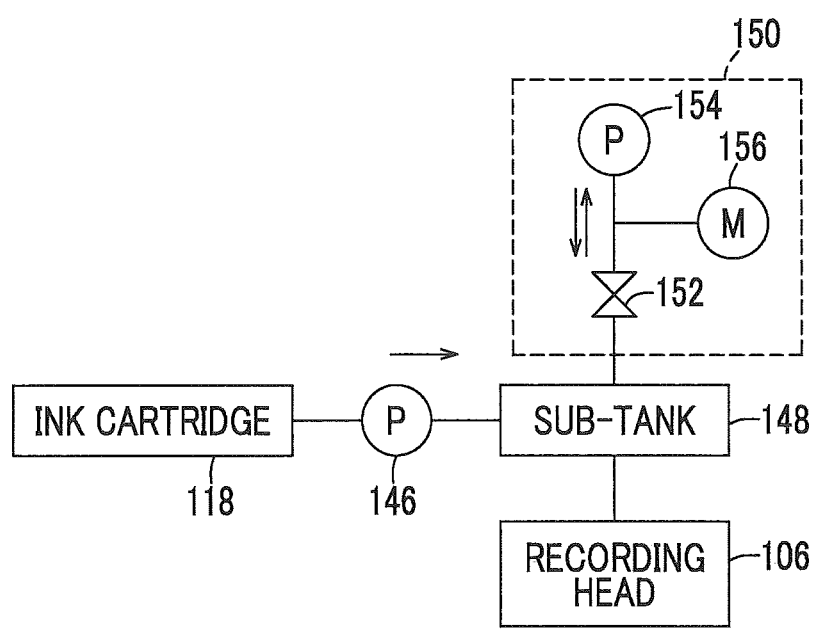
FIG. 15 is a block diagram illustrating a configuration of an ink supply system of the image forming apparatus.

FIG. 15 is a block diagram illustrating a configuration of an ink supply system of the image forming apparatus 100. As illustrated in FIG. 15, the ink contained in the ink cartridge 118 is sucked by a supply pump 146, and sent to the recording head 106 via a sub-tank 148. A pressure adjusting unit 150 for adjusting the ink pressure inside the sub-tank 148 is provided in the sub-tank 148.

The pressure adjusting unit 150 includes a valve 152, a pressurizing and depressurizing pump 154 connected to the sub-tank 148 via the valve 152, and a pressure gauge 156 provided between the valve 152 and the pressurizing and depressurizing pump 154.

During general printing, the pressurizing and depressurizing pump 154 operates to suck the ink in the sub-tank 148. Thus, the internal pressure of the sub-tank 148 and the internal pressure of the recording head 106 are maintained at a negative pressure.

On the other hand, during the maintenance of the recording head 106, the pressurizing and depressurizing pump 154 operates to pressurize the ink in the sub-tank 148. Thus, the inside of the sub-tank 148 and the inside of the recording head 106 are forced to pressurize, and the ink in the recording head 106 is discharged via each nozzle column 140 (refer to FIG. 14).

<Description of Control System of Image Forming Apparatus 100>

FIG. 16 is a block diagram illustrating a configuration of the image forming apparatus 100. As illustrated in FIG. 16, the image forming apparatus 100 includes a control device 160 as control means. For example, a computer which includes a central processing unit (CPU) can be used as the control device 160. The control device 160 functions as a control device which controls the whole image forming apparatus 100 according to a read program, and functions as a calculation device which performs various calculations.

The control device 160 includes a recording medium transport control unit 162, a carriage driving control unit 164, a light source control unit 166, the image processing unit 20 (refer to FIG. 3), and an ejection control unit 168. Each of these units can be realized by a hardware circuit or software, or a combination thereof.

The recording medium transport control unit 162 controls a transport driving unit 170 (transporting means) for performing a transport of the recording medium 10 (refer to FIG. 13). The transport driving unit 170 includes a driving motor which drives a pair of nip rollers 122 (refer to FIG. 13), and a driving circuit. The recording medium 10 which is transported on the platen 108 (refer to FIG. 13) is intermittently sent in the sub-scan direction by swath width unit, in accordance with a reciprocal scan (movement of the print path) in the main scan direction using the recording head 106.

The carriage driving control unit 164 controls a main scan driving unit 172 (transporting means) for moving the carriage 112 (refer to FIG. 12) in the main scan direction. The main scan driving unit 172 includes the driving motor connected to a movement mechanism of the carriage 112, and a control circuit thereof.

In addition, an encoder 174 is attached to the driving motor in the main scan driving unit 172 and the driving motor in the transport driving unit 170, and outputs a pulse signal according to a rotation amount and a rotation speed of the driving motor. The pulse signal is sent to the control device 160. The position of the carriage 112 and the position of the recording medium 10 are grasped based on the pulse signal output from the encoder 174.

The light source control unit 166 is control means which adjusts emitting amounts of the temporary curing light sources 114a and 114b (UV-LED elements 142) via an LED driving circuit 176 and adjusts emitting amounts of the present curing light sources 116a and 116b (UV-LED elements 144) via an LED driving circuit 178.

The LED driving circuits 176 and 178 output voltages of the voltage value according to a command output from a light source control unit 166, and adjusts emitting amounts of the UV-LED elements 142 and 144. The adjustment of the emitting amounts may be performed by changing a duty ratio of a driving waveform or a frequency of the driving waveform without a voltage change.

An input device 180 such as a manipulation panel and a display device 182 are connected to the control device 160. The input device 180 is means to which an external manipulation signal is manually input to the control device 160, and adopts various forms such as a keyboard, a mouse, a touch panel and a manipulation button, for example. Various forms such as a liquid crystal display, an organic EL display and a CRT are adopted in the display device 182. An operator can perform the input of printing conditions, the input and edition of additional information by manipulating the input device 180. In addition, the operator can confirm a variety of information such as input content and search results through the display of the display device 182.

In addition, an information storing unit 184 which stores various information, and an image input interface 186 for inputting an input image signal are provided in the image forming apparatus 100. A serial interface may be applied to the image input interface 186, and a parallel interface may be applied to the image input interface 186. An unillustrated buffer memory for a high speed communication may be mounted on the image forming apparatus 100.

A program which is performed by an unillustrated CPU included in the control device 160, and various data required for control are stored in the information storing unit 184. For example, the data which is stored in the information storing unit 184 includes separation conditions illustrated in FIG. 3 (the color conversion table 30 and the density table 32), the threshold value matrix (the first matrix 34 and the second matrix 36) or the like.

The image processing unit 20 performs a desired image processing with respect to the input image signal obtained through the image input interface 186, and thereby generating a control signal used for the ejection control of the ink droplets. The image processing unit 20 illustrated in FIG. 3 basically includes the resolution conversion unit 22, the color conversion processing unit 24, the halftone processing unit 26 and the dot size allocation unit 28. Since the function and operation of each unit is as described above, description thereof will be omitted.

The ejection control unit 168 generates an ejection control signal with respect to a head driving circuit 188, based on the control signal obtained by the image processing unit 20. A common driving voltage signal is applied with respect to each ejection energy generation element of the recording head 106 through the head driving circuit 188, ON and OFF of an unillustrated switch element which is connected to an individual electrode of each energy generation element are switched according to the ejection timing of each nozzle, and thereby the ink droplets are ejected from a corresponding nozzle among the nozzle columns 140 (refer to FIG. 14).

As described above, the image forming apparatus 100 according to the present embodiments includes the recording head 106 that ejects the ink droplets with multiple colors including the similar colors (C and LC, and M and LM), which are colors where either one of the density and the hue is equal to each other, the transporting unit (the transport driving unit 170 and the main scan driving unit 172) that relatively moves the recording head 106 and the recording medium 10 by transporting at least one of the recording head 106 and the recording medium 10 in a predetermined transport direction (X direction and Y direction), and the head driving circuit 188 that performs a driving control of the recording head 106 based on the control signal while the recording head and the recording medium are relatively moved, so as to sequentially form each dot and thereby generating the image.

In addition, the image processing unit 20 is provided which converts the input image signal into the control signal to be supplied to the head driving circuit 188 in a manner so that the dots of the similar colors are formed to be overlapped at a same position at a lower rate in a low density gradation range and at a higher rate in a high density gradation range, and thereby forming the image in which the surface smoothness is high in the low density gradation range and the surface smoothness is low in the high density gradation range.

By suppressing the surface smoothness of the image in the high density gradation range, while an ideally obtained gloss is decreased, the robustness with respect to the local degradation of the surface smoothness due the image forming process is increased. As a result, it is possible to suppress the generation of the gloss banding on the screen tint image resulting from the image forming process.

In addition, since the number of dots formed on the recording medium 10 in the low density gradation range is small, the influence of the gloss banding due to the image forming process is relatively small. Thus, the rate at which the dots of the similar colors are formed to be overlapped in the same position is decreased, thereby decreasing the noise and graininess of the image.

In addition, the present invention is not limited to the above-described embodiments, and may be freely modified without departing from the scope thereof.

For example, the present invention is not limited to graphic art (printing) applications, and may be variously applied to an image forming apparatus which is capable of forming image patterns, such as a device for drawing wires of an electronic circuit board, an apparatus for manufacturing various devices, a resist printing apparatus which uses resin droplets as functional droplets (equivalent to "ink") for ejection, and a fine structure forming apparatus.

What is claimed is:

1. An image forming apparatus configured to form a plurality of dots on a recording medium by ejecting ink droplets including a pigment as a colorant, comprising:

a recording head configured to eject the ink droplets of a plurality of colors including similar colors including at least a first color and a second color, the first color and the second color being colors of which densities or hues are equal to each other;

a transporting unit configured to relatively move the recording head and the recording medium by transporting at least one of the recording head and the recording medium in a predetermined transport direction;

a head driving circuit configured to perform a driving control of the recording head based on a control signal while the recording head and the recording medium are relatively moved by the transporting unit so as to sequentially form each dot and thereby generating an image; and an image processing unit configured to convert an input image signal into a control signal to be supplied to the head driving circuit in a manner so that the dots of the first color and the dots of the second color are formed to be overlapped at a same position at a lower rate in a low density gradation range and at a higher rate in a high density gradation range, wherein the first color is different than the second color.

2. The image forming apparatus according to claim 1, wherein the image processing unit includes:

a color conversion processing unit configured to perform a color conversion processing with respect to the input image signal and thereby obtain a device color signal for each color channel according to the plurality of colors; and a halftone processing unit configured to performs halftone processing with respect to each of the device color signals obtained by the color conversion processing unit, using a systematic dithering method which uses different threshold value matrixes depending on each color of the similar colors.

3. The image forming apparatus according to claim 2, wherein the different threshold value matrixes includes a reference threshold value matrix and another threshold value matrix obtained by sequentially shifting a threshold value of each matrix element of the reference threshold value matrix.

4. The image forming apparatus according to claim 3, wherein the first color includes a dark color and the second color includes a light color which have the same hue as each other and a different density from each other, and wherein the color conversion processing unit performs the color conversion processing in a manner so that the number of the light color dots is greater than the number of the dark color dots, in an arbitrary medium density gradation range.

5. The image forming apparatus according to claim 2, wherein the first color includes a dark color and the second color includes a light color which have a same hue as each other and a different density from each other, and wherein the color conversion processing unit performs the color conversion processing in a manner so that the number of the light color dots is greater than the number of the dark color dots, in an arbitrary medium density gradation range.

6. The image forming apparatus according to claim 1, wherein the dots of the first color and the dots of the second color are formed to be overlapped at the same position at the lower rate in the low density gradation range and at the higher rate in the high density gradation range so as to suppress the generation of a gloss banding on the image.

7. The image forming apparatus according to claim 1, wherein the image processing unit further converts the input image signal into the control signal so as to suppress a surface smoothness of the image in the high density gradation range.

8. The image forming apparatus according to claim 1, wherein a number of the dots formed on the recording medium in the low density gradation range is less than a number of dots formed on the recording medium in the high density gradation range.

9. The image forming apparatus according to claim 1, wherein the image is formed to have a surface smoothness higher in the low density gradation range than that in the high density gradation range.

10. An image forming method for forming a plurality of dots on a recording medium by ejecting ink droplets including a pigment as a colorant, by using an image forming apparatus that includes:

a recording head configured to eject the ink droplets with a plurality of colors including similar colors including at least a first color and a second color, the first color and the second color being colors of which densities or hues are equal to each other;

a transporting unit configured to relatively move the recording head and the recording medium by transporting at least one of the recording head and the recording medium in a predetermined transport direction; and a head driving circuit configured to perform a driving control of the recording head based on a control signal while the recording head and the recording medium are relatively moved by the transporting unit so as to sequentially form each dot and thereby generating an image, the method comprising:

converting an input image signal into a control signal to be supplied to the head driving circuit in a manner so that the dots of the first color and the dots of the second color are formed to be overlapped at a same position at a lower rate in a low density gradation range and at a higher rate in a high density gradation range, wherein the first color is different than the second color.

11. The method according to claim 10, wherein the dots of the first color and the dots of the second color are formed to be overlapped at the same position at the lower rate in the low density gradation range and at the higher rate in the high density gradation range so as to suppress the generation of a gloss banding on the image.

12. The method according to claim 10, wherein the converting the input image signal into the control signal to be supplied to the head driving circuit in a manner so suppress a surface smoothness of the image in the high density gradation range.

13. The method according to claim 10, wherein a number of the dots formed on the recording medium in the low density gradation range is less than a number of dots formed on the recording medium in the high density gradation range.

14. The method according to claim 10, wherein the image is formed to have a surface smoothness higher in the low density gradation range than that in the high density gradation range.

* * * * *